US012698216B2

(12) United States Patent　　　　　　　(10) Patent No.:　US 12,698,216 B2
Xie et al.　　　　　　　　　　　　　　　　　(45) Date of Patent:　　　Aug. 4, 2026

(54) HIGH-PERFORMANCE LITHIUM-NICKEL-MANGANESE-COBALT OXIDE (LNMCO) CATHODE MATERIAL FOR POWER BATTERIES AND PREPARATION METHOD THEREOF

(71) Applicants:GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Yinghao Xie, Foshan (CN); Haijun Yu, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP RECYCLING CO., LTD., Changsha (CN)

( * ) Notice: Subject to any disclaimer, the term of this patent is extended or adjusted under 35 U.S.C. 154(b) by 502 days.

(21) Appl. No.: 18/230,210

(22) Filed: Aug. 4, 2023

(65) Prior Publication Data

US 2024/0018014 A1　　　Jan. 18, 2024

Related U.S. Application Data

(63) Continuation of application No. PCT/CN2022/095680, filed on May 27, 2022.

(30) Foreign Application Priority Data

Aug. 3, 2021　(CN) ......................... 202110885776.6

(51) Int. Cl.
　　*H01M 4/505*　　(2010.01)
　　*C01G 53/44*　　(2025.01)
　　*H01M 4/525*　　(2010.01)

(52) U.S. Cl.
　　CPC ........... *C01G 53/44* (2013.01); *H01M 4/505* (2013.01); *H01M 4/525* (2013.01); *C01P 2004/03* (2013.01)

(58) Field of Classification Search
　　None
　　See application file for complete search history.

(56) References Cited

U.S. PATENT DOCUMENTS 6,383,235 B1 * 5/2002 Maegawa .............. C01G 51/42
　　　　　　　　　　　　　　　　　　　　　29/623.5
2017/0084907 A1 * 3/2017 Ou ...................... H01M 4/0471

FOREIGN PATENT DOCUMENTS

CN　　　　103904319 A　*　7/2014
CN　　　　113809319 A　*　12/2021
WO　　WO-2023010970 A1 *　2/2023 ........ H01M 10/0525

* cited by examiner

*Primary Examiner* — Tracy M Dove
(74) *Attorney, Agent, or Firm* — Westbridge IP LLC

(57)　　　　　　　　ABSTRACT

The present disclosure discloses a high-performance lithium-nickel-manganese-cobalt oxide (LNMCO) cathode material for power batteries and a preparation method thereof, and belongs to the technical field of lithium-ion battery (LIB) materials. The preparation method of an LNMCO cathode material of the present disclosure combines a melting and mixing method, a spray drying method, a sol-gel method, and a high-temperature solid-phase method to achieve thorough mixing of various components of a precursor, such that a prepared product has a uniform particle size, excellent electrochemical performance, and high cycling stability. The method has simple operation steps, low raw material cost, small time consumption, and (Continued)

high production efficiency, and can realize industrialized large-scale production. The present disclosure also provides an LNMCO cathode material prepared by the method, which has high specific charge/discharge capacity, thermal stability, and cycling stability.

9 Claims, 1 Drawing Sheet

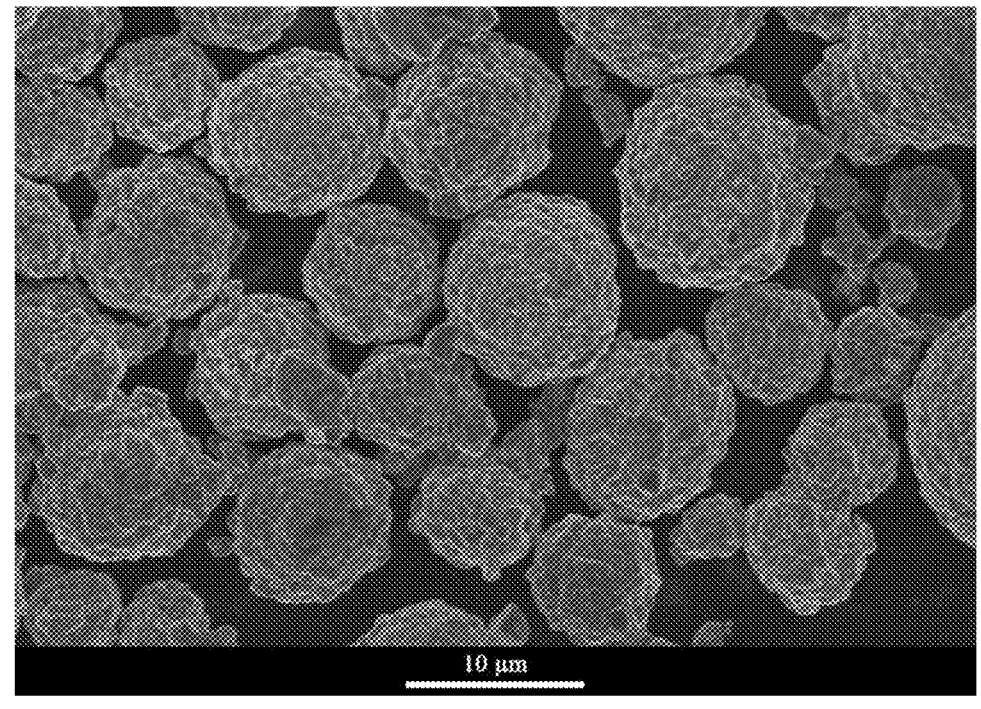

HIGH-PERFORMANCE LITHIUM-NICKEL-MANGANESE-COBALT OXIDE (LNMCO) CATHODE MATERIAL FOR POWER BATTERIES AND PREPARATION METHOD THEREOF

CROSS-REFERENCE TO RELATED APPLICATIONS

The present application is a continuation application of PCT application No. PCT/CN2022/095680 filed on May 27, 2022, which claims the benefit of Chinese Patent Application No. 202110885776.6 filed on Aug. 3, 2021. The contents of all of the aforementioned applications are incorporated by reference herein in their entirety.

TECHNICAL FIELD

The present disclosure relates to the field of lithium-ion battery (LIB) materials, and in particular to a high-performance lithium-nickel-manganese-cobalt oxide (LNMCO) cathode material for power batteries and a preparation method thereof.

BACKGROUND ART

Under the guidance of national policies, new energy vehicles, especially electric vehicles, have been widely promoted due to their advantages of energy conservation and environmental protection, and are expected to fully replace traditional fuel-engined vehicles before the end of this century. Batteries are the key to the development of electric vehicles, and among automotive power batteries, LIB is considered to be one of the most promising power batteries due to its advantages such as high safety, high specific capacity, and long charge-discharge cycle life. The selection of a cathode material is a key factor for the performance of LIB.

At present, commonly-used LIB cathode materials mainly include lithium-cobalt oxide (LCO), lithium-nickel oxide (LNO), lithium iron phosphate (LFP), etc. LNMCO is an improved ternary material with a single doped anion material, which has excellent electrochemical performance, stable discharge voltage plateau, wide working voltage, and high safety, and can effectively compensate for the shortcomings of LNO, lithium-manganese oxide (LMO), and LCO. However, in existing common preparation methods of lithium-nickel-manganese oxide (LNMO), such as solid-phase method or co-precipitation method, a precursor raw material powder is obtained mostly by ball-milling or grinding, so it is difficult to achieve sufficient mixing of various components, which results in low dispersibility and uniformity and also makes a prepared product have defects such as uneven particle size distribution, agglomeration, and low purity. Moreover, a preparation process is time-consuming and inefficient. The sol-gel method or CVD method can achieve thorough mixing of raw materials, such that a prepared product has a uniform particle size distribution. However, these methods involve harsh conditions, high requirements on preparation equipment and environment, and low repeatability, which makes it difficult to achieve large-scale production.

SUMMARY

Based on the defects in the prior art, an objective of the present disclosure is to provide a preparation method of a high-performance LNMCO cathode material for power batteries. The method combines a sol-gel method, a spray drying method, and a high-temperature solid-phase method, such that a prepared product has high stability and prominent uniform dispersion, which not only effectively retains the high charge/discharge efficiency of a cathode material, but also improves the lithium insertion-deinsertion cycling stability of the overall material. The preparation method involves simple operation steps and low requirements on equipment, and can realize industrialized large-scale production.

In order to achieve the above objective, the present disclosure adopts the following technical solutions:

A preparation method of a high-performance LNMCO cathode material for power batteries is provided, including the following steps:

(1) mixing a first lithium source, a nickel source, a cobalt source, and a manganese source with a straight-chain carboxylic acid in a molten state, and subjecting a resulting mixture to ultrasonic vibration for 0.5 h to 1 h to obtain a precursor A;

(2) subjecting the precursor A to spray drying granulation in a spray dryer to obtain a precursor powder B;

(3) thoroughly mixing a second lithium source, citric acid, a carbon source, and water, adjusting a pH of a resulting solution to 6.5 to 7.5, then heating the resulting solution until the resulting solution is clear; subsequently, adding the precursor powder B to the resulting solution, and subjecting a resulting mixture to ultrasonic vibration for 12 h to 24 h to obtain a precursor gel mixed liquid C; where the second lithium source is lithium acetate; a molar ratio of lithium atoms in the second lithium source to lithium atoms in the first lithium source is 1:1; the carbon source is at least one from the group consisting of glucose, maltose, and trehalose; and the second lithium source, the citric acid, the carbon source, and the water are at a mass ratio ($m_{second\ lithium\ source}:m_{citric\ acid}:m_{carbon\ source}:m_{water}$) of (1-2):(10-15):(1-3):(30-35); and (4) subjecting the precursor gel mixed liquid C to spray drying granulation in a spray dryer to obtain a precursor powder D; and heating the precursor powder D to 600° C. to 700° C. and incubating for 10 h to 15 h to obtain the high-performance LNMCO cathode material for power batteries; where a mixture of nitrogen and hydrogen is introduced to form a protective atmosphere during incubation, and a volume ratio of the nitrogen to the hydrogen is (90-95):(5-10).

In the present disclosure, a carboxylic acid with a specific carbon-atom chain is used as an organic solvent, which can not only play the roles of a solvent and a dispersant, but also can effectively link lithium, nickel, manganese, and cobalt atoms in the precursor due to easy formation of intermolecular hydrogen bonding among carboxylic acid molecules, thereby increasing a tap density of a final product.

The spray drying method is used to prepare a precursor powder, which can avoid the defects of agglomeration and nonuniformity in a product caused by the traditional solid-phase grinding method. Moreover, the spray drying method has short operation time, high repeatability, and high production efficiency.

The introduction of a lithium source and a carbon source by the sol-gel method can ensure that the lithium source can form a network connection with other components before sintering, such that a prepared product has higher uniformity than a product prepared by a method where a lithium source or a carbon source is directly added or added during a spray granulation process. Moreover, the sol-gel method can ensure a uniform thickness for a formed amorphous carbon coating layer, which can effectively isolate a cathode material and an electrolyte to avoid a reaction of the two in a power battery prepared from the product, thereby providing high cycling stability and thermal stability for a material.

The preparation method of a high-performance LNMCO cathode material for power batteries according to the present disclosure combines a melting and mixing method, a spray drying method, a sol-gel method, and a high-temperature solid-phase method to achieve thorough mixing of various components of a precursor, such that a prepared product has a uniform particle size, excellent electrochemical performance, and high cycling stability. The method has simple operation steps, low raw material cost, small time consumption, and high production efficiency, and can realize industrialized large-scale production.

Preferably, in step (1), Li, Ni, Co, and Mn in the precursor A may be at an atomic molar ratio (Li:Ni:Co:Mn) of 0.5:a:b:(1-a-b), where a=0.2 to 0.4 and b=0.2 to 0.4; and the straight-chain carboxylic acid may have 10 to 13 carbon atoms.

Preferably, in step (1), metal ions in the precursor A may have a molar concentration of 3 mol/L to 4.5 mol/L.

Preferably, in step (1), the first lithium source may include at least one from the group consisting of lithium acetate, lithium citrate, lithium carbonate, and lithium hydroxide; the nickel source may include at least one from the group consisting of nickel acetate, nickel citrate, nickel carbonate, and nickel nitrate hexahydrate; the cobalt salt may include at least one from the group consisting of cobalt acetate, cobalt citrate, cobalt carbonate, and cobalt nitrate hexahydrate; and the manganese salt may include at least one from the group consisting of manganese acetate, manganese citrate, and manganese nitrate hexahydrate.

Preferably, in step (1), the precursor A may further include a viscosity adjusting agent; the viscosity adjusting agent may have a concentration of 2 g/L to 3 g/L; and the viscosity adjusting agent may include at least one from the group consisting of glyoxal, glutaraldehyde, benzaldehyde, and cinnamaldehyde.

An appropriate amount of the viscosity adjusting agent can be added to effectively adjust a viscosity of the precursor A before spray granulation, which can avoid nozzle clogging or discontinuous spraying.

Preferably, in step (2), during the spray drying granulation, the spray dryer may have a feed speed of 1,000 mL/h to 2,000 mL/h, a nozzle pressure of 0.4 MPa to 0.6 MPa, a feed temperature of 450° C. to 550° C., and a discharge temperature of 350° C. to 450° C.

Through spray drying under the above conditions, an obtained powder product has uniformly-dispersed particles, a feed process has high efficiency, and no nozzle clogging or discontinuous spraying occurs.

Preferably, in step (3), the heating may be conducted at 70° C. to 80° C. for 1 h to 2 h.

At the temperature and time, citric acid can fully chelate cations to form a tightly-connected gel network, and the carbon source can fully wrap the precursor and the lithium source, thereby ensuring the uniformity of a carbon-coated cathode material subsequently prepared.

Preferably, in step (3), the second lithium source, the citric acid, the carbon source, and the water may be at a mass ratio ($m_{second\ lithium\ source}$:$m_{citric\ acid}$:$m_{carbon\ source}$:$m_{water}$) of 1.6:12:1.5:35.

The above ratio can ensure that citric acid can fully chelate cations during a gel formation process, and the addition amount of the carbon source allows a finally-formed amorphous carbon layer to provide both high specific capacity and high cycling stability for a cathode material, which prevents the cycling stability of a material from deteriorating due to a too-thin carbon layer or prevents the overall theoretical capacity of a material from deteriorating due to a too-thick carbon layer.

Preferably, in step (3), the precursor gel mixed liquid C may further include a thickening agent; the thickening agent may be sodium alginate; and a mass ratio of the sodium alginate to the water may be (1-1.5):10.

As a natural substance that is easily soluble in water, sodium alginate itself has some viscosity. When introduced into a gel as a thickening agent, sodium alginate can further fix an insoluble precursor powder and ensure the uniformity of the overall gel.

Preferably, in step (4), during the spray drying granulation, the spray dryer may have a feed speed of 1,500 mL/h to 3,000 mL/h, a nozzle pressure of 0.2 MPa to 0.3 MPa, a feed temperature of 150° C. to 100° C., and a discharge temperature of 80° C. to 100° C.; and the spray drying granulation may be conducted in an inert atmosphere.

Since the raw material for the spray drying granulation in step (4) is a gel of mixed powder particles, specific treatment operations are required to ensure uniform dispersion for a product of spray granulation and a continuous and efficient preparation process. If the nozzle pressure is too low, the high-mass mixed precursor cannot be timely ejected out for granulation, resulting in low efficiency; and if the nozzle pressure is too high, nozzle clogging or particle nonuniformity may occur.

Preferably, in step (4), a volume ratio of the nitrogen to the hydrogen may be 95:5.

A small amount of a reducing gas can be added in a specific proportion to prevent amorphous carbon in a sample from being oxidized due to a small amount of residual oxygen or other impurities during a pyrolysis process, thereby improving the purity and theoretical capacity of a product.

Another objective of the present disclosure is to provide an LNMCO cathode material prepared by the preparation method of a high-performance LNMCO cathode material for power batteries described above.

The LNMCO cathode material of the present disclosure is prepared by a composite method, which has both high purity and uniform dispersion. The material is modified by carbon coating, and thus a power battery prepared from the material has effectively-improved structural stability at lithium insertion and deinsertion, and high thermal stability and cycling efficiency.

Beneficial effects of the present disclosure: The present disclosure provides a preparation method of a high-performance LNMCO cathode material for power batteries. The method combines a melting and mixing method, a spray drying method, a sol-gel method, and a high-temperature solid-phase method to achieve thorough mixing of various components of a precursor, such that a prepared product has a uniform particle size, excellent electrochemical performance, and high cycling stability. The method has simple operation steps, low raw material cost, small time consumption, and high production efficiency, and can realize industrialized large-scale production. The present disclosure also provides an LNMCO cathode material prepared by the method, which has high specific charge/discharge capacity, thermal stability, and cycling stability.

BRIEF DESCRIPTION OF DRAWINGS

The sole FIGURE is a scanning electron microscopy (SEM) image of the LNMCO cathode material of the present disclosure.

DETAILED DESCRIPTION

In order to well illustrate the objectives, technical solutions, and advantages of the present disclosure, the present disclosure will be further described below in conjunction with specific examples and comparative examples, which is intended to comprehend the content of the present disclosure in detail, rather than limit the present disclosure. All other examples obtained by those of ordinary skill in the art without creative efforts shall fall within the protection scope of the present disclosure. Unless otherwise specified, the experimental reagents and instruments designed for the implementation of the present disclosure are commonly-used reagents and instruments.

Example 1

An example of the preparation method of a high-performance LNMCO cathode material for power batteries according to the present disclosure was provided, including the following steps:

(1) lithium acetate, nickel acetate, cobalt acetate, manganese acetate, and 6 g of glyoxal were added to 3 L of dodecanoic acid in a molten state, and a resulting mixture was subjected to ultrasonic vibration for 40 min to obtain a precursor A, where Li, Ni, Co, and Mn in the precursor A were at an atomic molar ratio (Li:Ni:Co:Mn) of 0.5:0.3:0.3:0.4, and metal ions in the precursor A had a molar concentration of 3.5 mol/L;

(2) the precursor A was subjected to spray drying granulation in a spray dryer at a feed speed of 1,500 mL/h to obtain a precursor powder B, where the spray dryer had a nozzle pressure set to 0.5 MPa, a feed temperature set to 500° C., and a discharge temperature set to 400° C.;

(3) lithium acetate, citric acid, glucose, and water were thoroughly mixed, a pH of a resulting solution was adjusted to 7, and then the resulting solution was heated for 1 h at 75° C. until the resulting solution was clear; and the precursor powder B was added to the resulting solution, and a resulting mixture was subjected to ultrasonic vibration for 24 h to obtain a precursor gel mixed liquid C; where a molar ratio of lithium atoms in the lithium acetate to lithium atoms in the precursor A was 1:1, and the lithium acetate, citric acid, glucose, and water were at a mass ratio ($m_{second\ lithium\ source}$:$m_{citric\ acid}$:$m_{carbon\ source}$:$m_{water}$) of 1.6:12:1.5:35; and (4) the precursor gel mixed liquid C was subjected to spray drying granulation in a spray dryer with an inert atmosphere to obtain a precursor powder D; and the precursor powder D was heated to 650° C. and incubated for 12 h to obtain the high-performance LNMCO cathode material for power batteries; where a mixture of nitrogen and hydrogen was introduced to form a protective atmosphere during incubation, and a volume ratio of the nitrogen to the hydrogen was 95:5; and during the spray drying granulation, the spray dryer had a feed speed set to 2,000 mL/h, a nozzle pressure set to 0.3 MPa, a feed temperature set to 120° C., and a discharge temperature set to 100° C.

Example 2

An example of the preparation method of a high-performance LNMCO cathode material for power batteries according to the present disclosure was provided, including the following steps:

(1) lithium citrate, nickel citrate, cobalt citrate, manganese citrate, and 9 g of glyoxal were added to 3 L of dodecanoic acid in a molten state, and a resulting mixture was subjected to ultrasonic vibration for 1 h to obtain a precursor A, where Li, Ni, Co, and Mn in the precursor A were at an atomic molar ratio (Li:Ni:Co:Mn) of 0.5:0.35:0.35:0.3, and metal ions in the precursor A had a molar concentration of 3 mol/L;

(2) the precursor A was subjected to spray drying granulation in a spray dryer at a feed speed of 1,000 mL/h to obtain a precursor powder B, where the spray dryer had a nozzle pressure set to 0.4 MPa, a feed temperature set to 550° C., and a discharge temperature set to 450° C.;

(3) lithium acetate, citric acid, glucose, and water were thoroughly mixed, a pH of a resulting solution was adjusted to 7, and then the resulting solution was heated for 1 h at 80° C. until the resulting solution was clear; and the precursor powder B was added to the resulting solution, and a resulting mixture was subjected to ultrasonic vibration for 18 h to obtain a precursor gel mixed liquid C; where a molar ratio of lithium atoms in the lithium acetate to lithium atoms in the precursor A was 1:1, and the lithium acetate, citric acid, glucose, and water were at a mass ratio ($m_{second\ lithium\ source}$:$m_{citric\ acid}$:$m_{carbon\ source}$:$m_{water}$) of 1:15:1.5:35; and (4) the precursor gel mixed liquid C was subjected to spray drying granulation in a spray dryer with an inert atmosphere to obtain a precursor powder D; and the precursor powder D was heated to 700° C. and incubated for 10 h to obtain the high-performance LNMCO cathode material for power batteries; where a mixture of nitrogen and hydrogen was introduced to form a protective atmosphere during incubation, and a volume ratio of the nitrogen to the hydrogen was and during the spray drying granulation, the spray dryer had a feed speed set to 1,500 mL/h, a nozzle pressure set to 0.3 MPa, a feed temperature set to 100° C., and a discharge temperature set to 80° C.

Example 3

An example of the preparation method of a high-performance LNMCO cathode material for power batteries according to the present disclosure was provided, including the following steps:

(1) lithium acetate, nickel acetate, cobalt acetate, and manganese acetate were added to 3 L of dodecanoic acid in a molten state, and a resulting mixture was subjected to ultrasonic vibration for 40 min to obtain a precursor A, where Li, Ni, Co, and Mn in the precursor A were at an atomic molar ratio (Li:Ni:Co:Mn) of 0.5:0.3:0.3:0.4, and metal ions in the precursor A had a molar concentration of 4.5 mol/L;

(2) the precursor A was subjected to spray drying granulation in a spray dryer at a feed speed of 1,500 mL/h to obtain a precursor powder B, where the spray dryer had a nozzle pressure set to 0.5 MPa, a feed temperature set to 500° C., and a discharge temperature set to 400° C.;

(3) lithium acetate, citric acid, glucose, sodium alginate, and water were thoroughly mixed, a pH of a resulting solution was adjusted to 7, and then the resulting solution was heated for 1 h at 75° C. until the resulting solution was clear; and the precursor powder B was added to the resulting solution, and a resulting mixture was subjected to ultrasonic vibration for 24 h to obtain a precursor gel mixed liquid C; where a molar ratio of lithium atoms in the lithium acetate to lithium atoms in the precursor A was 1:1, and the lithium acetate, citric acid, sodium alginate, glucose, and water were at a mass ratio ($m_{second\ lithium\ source}$:$m_{citric\ acid}$:$m_{carbon\ source}$:$m_{water}$:$m_{sodium\ alginate}$) of 1:15:1.5:35:3.5; and (4) the precursor gel mixed liquid C was subjected to spray drying granulation in a spray dryer with an inert atmosphere to obtain a precursor powder D; and the precursor powder D was heated to 600° C. and incubated for 15 h to obtain the high-performance LNMCO cathode material for power batteries; where a mixture of nitrogen and hydrogen was introduced to form a protective atmosphere during incubation, and a volume ratio of the nitrogen to the hydrogen was and during the spray drying granulation, the spray dryer had a feed speed set to 2,000 mL/h, a nozzle pressure set to 0.3 MPa, a feed temperature set to 120° C., and a discharge temperature set to 100° C.

Comparative Example 1

A comparative example of the preparation method of a high-performance LNMCO cathode material for power batteries according to the present disclosure was provided, including the following steps:

(1) lithium acetate, nickel acetate, cobalt acetate, manganese acetate, and 6 g of glyoxal were added to 3 L of dodecanoic acid in a molten state, and a resulting mixture was subjected to ultrasonic vibration for 40 min to obtain a precursor A, where Li, Ni, Co, and Mn in the precursor A were at an atomic molar ratio (Li:Ni:Co:Mn) of 0.5:0.3:0.3:0.4, and metal ions in the precursor A had a molar concentration of 3.5 mol/L;

(2) the precursor A was subjected to spray drying granulation in a spray dryer at a feed speed of 1,500 mL/h to obtain a precursor powder B, where the spray dryer had a nozzle pressure set to 0.5 MPa, a feed temperature set to 500° C., and a discharge temperature set to 400° C.;

(3) lithium acetate and water were thoroughly mixed, the precursor powder B was added, and a resulting mixture was subjected to ultrasonic vibration for 24 h to obtain a precursor mixed solution C; where a molar ratio of lithium atoms in the lithium acetate to lithium atoms in the precursor A was 1:1, and the lithium acetate and water were at a mass ratio ($m_{second\ lithium\ source}$:$m_{water}$) of 1.6:35; and (4) the precursor gel mixed liquid C was subjected to spray drying granulation in a spray dryer with an inert atmosphere to obtain a precursor powder D; and the precursor powder D was heated to 650° C. and incubated for 12 h to obtain the high-performance LNMCO cathode material for power batteries; where a mixture of nitrogen and hydrogen was introduced to form a protective atmosphere during incubation, and a volume ratio of the nitrogen to the hydrogen was 95:5; and during the spray drying granulation, the spray dryer had a feed speed set to 3,000 mL/h, a nozzle pressure set to 0.3 MPa, a feed temperature set to 100° C., and a discharge temperature set to 800° C.

Comparative Example 2

This comparative example was different from Example 1 only in that, in step (3), the lithium acetate, citric acid, glucose, and water were at a mass ratio ($m_{second\ lithium\ source}$:$m_{citric\ acid}$:$m_{carbon\ source}$:$m_{water}$) of 1.6:12:10:35.

Comparative Example 3

This comparative example was different from Example 1 only in that, in step (3), the lithium acetate, citric acid, glucose, and water were at a mass ratio ($m_{second\ lithium\ source}$:$m_{citric\ acid}$:$m_{carbon\ source}$:$m_{water}$) of 1.6:12:0.1:35.

Comparative Example 4

This comparative example was different from Example 1 only in that, in step (3), the ultrasonic vibration was conducted for 5 h.

Effect Example 1

Each of the products obtained in Examples 1 to 3 and Comparative Examples 1 to 4 was used as a positive electrode and lithium was used as a negative electrode to assemble a lithium-ion half-cell. The initial discharge test was conducted at a rate of 1 C and a voltage range of 4.5 V to 1.8 V, then 200 charge-discharge cycles were conducted, and test results were shown in Table 1.

TABLE 1

| Item | Initial specific discharge capacity (mAh/g) | Specific discharge capacity after 200 charge-discharge cycles (mAh/g) | Capacity retention after 200 charge-discharge cycles (%) |
|---|---|---|---|
| Example 1 | 149 | 142 | 95.3 |
| Example 2 | 151 | 139 | 92.05 |
| Example 3 | 148 | 133 | 89.86 |
| Comparative Example 1 | 152 | 120 | 78.94 |
| Comparative Example 2 | 135 | 125 | 92.59 |
| Comparative Example 3 | 152 | 127 | 83.56 |
| Comparative Example 4 | 148 | 126 | 85.14 |

It can be seen from Table 1 that the products obtained in Examples 1 to 3 had higher cycling stability and specific discharge capacity than the products obtained in the comparative examples; and the product obtained in Example 1 still had a specific discharge capacity of 142 mAh/g after 200 cycles. As shown in the sole FIGURE, the product of Example 1 was observed under a scanning electron microscope, and it can be seen that the product had uniform dispersion, without agglomeration. The sol-gel method was not used in Comparative Example 1, and a product subsequently prepared was not under the protection of amorphous carbon, which made the product have poor cycling stability. The products obtained in Comparative Examples 2 and 3 failed to achieve both high specific discharge capacity and high cycling stability due to an improper carbon source addition proportion. The product obtained in Comparative Example 4 also had compromised cycling stability due to insufficient dispersibility of components caused by short ultrasonic dispersion time during the preparation of the precursor.

The products obtained in Examples 1 to 3 and Comparative Examples 1 to 4 were subjected to rate test: conducting 5 cycles at a rate of 1 C, conducting 10 cycles at a rate of 5 C, and cycling at a rate of 1 C once again. Data for the last cycle at each rate were recorded, and test results were shown in Table 2.

TABLE 2

| Item | Specific discharge capacity at 1 C (mAh/g) | Specific discharge capacity at 5 C (mAh/g) | Specific discharge capacity at 1 C once again (mAh/g) | Capacity recovery rate (%) |
|---|---|---|---|---|
| Example 1 | 150 | 112 | 148 | 98.67 |
| Example 2 | 150 | 108 | 146 | 97.33 |
| Example 3 | 148 | 105 | 145 | 97.98 |
| Comparative Example 1 | 151 | 86 | 135 | 89.4 |
| Comparative Example 2 | 134 | 98 | 130 | 97.01 |
| Comparative Example 3 | 150 | 85 | 139 | 92.66 |
| Comparative Example 4 | 149 | 102 | 142 | 95.3 |

It can be seen from Table 2 that, due to the special coating modification, the products in Examples 1 to 3 had excellent rate performance, and showed a capacity recovery rate of more than 97% in tests at different current densities.

Finally, it should be noted that the above examples are provided merely to describe the technical solutions of the present disclosure, rather than to limit the protection scope of the present disclosure. Although the present disclosure is described in detail with reference to preferred examples, a person of ordinary skill in the art should understand that modifications or equivalent replacements may be made to the technical solutions of the present disclosure without departing from the spirit and scope of the technical solutions of the present disclosure.

The invention claimed is:

1. A preparation method of a high-performance lithium-nickel-manganese-cobalt oxide (LNMCO) cathode material for power batteries, comprising the following steps:
   (1) mixing a first lithium source, a nickel source, a cobalt source, and a manganese source with a straight-chain carboxylic acid in a molten state, and subjecting a resulting mixture to ultrasonic vibration for 0.5 h to 1 h to obtain a precursor A;

(2) subjecting the precursor A to spray drying granulation in a spray dryer to obtain a precursor powder B;
   (3) thoroughly mixing a second lithium source, citric acid, a carbon source, and water, adjusting a pH of a resulting solution to 6.5 to 7.5, then heating the resulting solution until the resulting solution is clear; subsequently, adding the precursor powder B to the resulting solution, and subjecting a resulting mixture to ultrasonic vibration for 12 h to 24 h to obtain a precursor gel mixed liquid C; wherein the second lithium source is lithium acetate; a molar ratio of lithium atoms in the second lithium source to lithium atoms in the first lithium source is 1:1; the carbon source is at least one from the group consisting of glucose, maltose, and trehalose; and the second lithium source, the citric acid, the carbon source, and the water are at a mass ratio $(m_{second\ lithium\ source}:m_{citric\ acid}:m_{carbon\ source}:m_{water})$ of (1-2):(10-15):(1-3):(30-35); and
   (4) subjecting the precursor gel mixed liquid C to spray drying granulation in a spray dryer to obtain a precursor powder D; and heating the precursor powder D to 600° C. to 700° C. and incubating for 10 h to 15 h to obtain the high-performance LNMCO cathode material for power batteries; wherein a mixture of nitrogen and hydrogen is introduced to form a protective atmosphere during incubation, and a volume ratio of the nitrogen to the hydrogen is (90-95):(5-10).

2. The preparation method of a high-performance LNMCO cathode material for power batteries according to claim 1, wherein in step (1), Li, Ni, Co, and Mn in the precursor A are at an atomic molar ratio (Li:Ni:Co:Mn) of 0.5:a:b:(1-a-b), wherein a=0.2 to 0.4 and b=0.2 to 0.4; and the straight-chain carboxylic acid has 10 to 13 carbon atoms; and metal ions in the precursor A have a molar concentration of 3 mol/L to 4.5 mol/L.

3. The preparation method of a high-performance LNMCO cathode material for power batteries according to claim 1, wherein in step (1), the first lithium source comprises at least one from the group consisting of lithium acetate, lithium citrate, lithium carbonate, and lithium hydroxide; the nickel source comprises at least one from the group consisting of nickel acetate, nickel citrate, nickel carbonate, and nickel nitrate hexahydrate; the cobalt source comprises at least one from the group consisting of cobalt acetate, cobalt citrate, cobalt carbonate, and cobalt nitrate hexahydrate; and the manganese source comprises at least one from the group consisting of manganese acetate, manganese citrate, and manganese nitrate hexahydrate.

4. The preparation method of a high-performance LNMCO cathode material for power batteries according to claim 1, wherein in step (1), the precursor A further comprises a viscosity adjusting agent; the viscosity adjusting agent has a concentration of 2 g/L to 3 g/L; and the viscosity adjusting agent comprises at least one from the group consisting of glyoxal, glutaraldehyde, benzaldehyde, and cinnamaldehyde.

5. The preparation method of a high-performance LNMCO cathode material for power batteries according to claim 1, wherein in step (2), during the spray drying granulation, the spray dryer has a feed speed of 1,000 mL/h to 2,000 mL/h, a nozzle pressure of 0.4 MPa to 0.6 MPa, a feed temperature of 450° C. to 550° C., and a discharge temperature of 350° C. to 450° C.

6. The preparation method of a high-performance LNMCO cathode material for power batteries according to claim 1, wherein in step (3), the heating is conducted at 70° C. to 80° C. for 1 h to 2 h.

7. The preparation method of a high-performance LNMCO cathode material for power batteries according to claim 1, wherein in step (3), the second lithium source, the citric acid, the carbon source, and the water are at a mass ratio ($m_{second\ lithium\ source}$:$m_{citric\ acid}$:$m_{carbon\ source}$:$m_{water}$) of 1.6:12:1.5:35.

8. The preparation method of a high-performance LNMCO cathode material for power batteries according to claim 1, wherein in step (3), the precursor gel mixed liquid C further comprises a thickening agent; the thickening agent is sodium alginate; and a mass ratio of the sodium alginate to the water is (1-1.5): 10.

9. The preparation method of a high-performance LNMCO cathode material for power batteries according to claim 1, wherein in step (4), during the spray drying granulation, the spray dryer has a feed speed of 1,500 mL/h to 3,000 mL/h, a nozzle pressure of 0.2 MPa to 0.3 MPa, a feed temperature of 150° C. to 100° C., and a discharge temperature of 80° C. to 100° C.; and the spray drying granulation is conducted in an inert atmosphere.

* * * * *